United States Patent
Nusser et al.

(10) Patent No.: US 9,505,136 B1
(45) Date of Patent: Nov. 29, 2016

(54) PRECISION ASSEMBLY OF ROBOTIC COMPONENTS

(71) Applicant: Redwood Robotics, Inc., San Francisco, CA (US)

(72) Inventors: Stefan Nusser, San Francisco, CA (US); Advait Jain, San Francisco, CA (US); Anthony Jules, San Francisco, CA (US); James Nicholas Vines, San Francisco, CA (US); Aaron Edsinger, San Francisco, CA (US); Attila Kabai, San Francisco, CA (US)

(73) Assignee: Redwood Robotics, San Francisco, CA (US)

( * ) Notice: Subject to any disclaimer, the term of this patent is extended or adjusted under 35 U.S.C. 154(b) by 1 day.

(21) Appl. No.: 14/313,018

(22) Filed: Jun. 24, 2014

Related U.S. Application Data

(60) Provisional application No. 61/838,703, filed on Jun. 24, 2013.

(51) Int. Cl.
| | | |
|---|---|---|
| *B25J 17/00* | (2006.01) | |
| *B25J 19/00* | (2006.01) | |
| *B25J 9/08* | (2006.01) | |
| *B25J 15/04* | (2006.01) | |
| *F16L 19/02* | (2006.01) | |

(52) U.S. Cl.
CPC ........ *B25J 17/00* (2013.01); *B25J 9/08* (2013.01); *B25J 15/04* (2013.01); *B25J 15/0408* (2013.01); *B25J 19/0033* (2013.01); *F16L 19/02* (2013.01)

(58) Field of Classification Search
CPC B25J 17/0241; B25J 17/025; B25J 19/0033; B25J 15/04; B25J 15/0408; B25J 15/0433

USPC ................... 74/490.05; 901/27, 28
IPC ......... Y10T 403/64,403/642, 403/645, 403/648
See application file for complete search history.

(56) References Cited

U.S. PATENT DOCUMENTS

| | | | | |
|---|---|---|---|---|
| 4,225,160 A | * | 9/1980 | Ortloff | F16L 23/08 285/123.2 |
| 4,905,938 A | * | 3/1990 | Braccio | F16L 37/1205 244/101 |
| 5,069,524 A | * | 12/1991 | Watanabe | B25J 15/04 250/227.11 |
| 5,098,253 A | * | 3/1992 | Du | B25J 15/04 403/350 |

(Continued)

*Primary Examiner* — William Kelleher
*Assistant Examiner* — Joseph Brown
(74) *Attorney, Agent, or Firm* — McDonnell Boehnen Hulbert & Berghoff LLP

(57) ABSTRACT

Examples for precision assembly of robotic components are described herein. A robotic manipulator may require the assembly and disassembly of its components. To enable efficient assembly of the robotic manipulator, an example assembly may include connection links between robotic components that enable functional and precise assembly. In one embodiment, an example assembly may include connection links having various structural features positioned incrementally at respective positions proximal to outside edges of the connection links for securing the connection links together in a fixed, immovable geometric configuration. In some instances, the connection links may further include electrical components or slots for electrical components of components for establishing electrical connections between the connection links within the assembly. Further, an example assembly may include a clamping component for providing axial force to secure the connection links in the precise configuration.

12 Claims, 7 Drawing Sheets

(56) References Cited

U.S. PATENT DOCUMENTS

| | | | | |
|---|---|---|---|---|
| 5,192,844 A * | 3/1993 | Todd | ................ | B23K 3/033 |
| | | | | 219/85.16 |
| 5,782,571 A * | 7/1998 | Hufford | ................ | B25J 15/04 |
| | | | | 403/288 |
| 6,945,814 B2 * | 9/2005 | Snape | ................ | H01R 35/02 |
| | | | | 439/165 |
| 7,282,017 B2 * | 10/2007 | Jordil | ................ | B23Q 1/0072 |
| | | | | 279/71 |
| 7,779,716 B2 * | 8/2010 | Dellach | ................ | B25J 15/04 |
| | | | | 414/738 |
| 7,794,171 B2 * | 9/2010 | Park | ................ | B25J 3/04 |
| | | | | 403/349 |
| 8,544,360 B2 * | 10/2013 | Liu | ................ | B25J 19/0029 |
| | | | | 74/490.02 |
| 2010/0090458 A1 * | 4/2010 | Schulz | ................ | F16L 37/248 |
| | | | | 285/26 |
| 2011/0136376 A1 * | 6/2011 | Johnson | ................ | A61F 2/76 |
| | | | | 439/529 |

\* cited by examiner

PRECISION ASSEMBLY OF ROBOTIC COMPONENTS

CROSS-REFERENCE TO RELATED APPLICATION

The present application claims priority to U.S. Patent Application Ser. No. 61/838,703, filed on Jun. 24, 2013, the entire contents of which are herein incorporated by reference.

BACKGROUND

Unless otherwise indicated herein, the materials described in this section are not prior art to the claims in this application and are not admitted to be prior art by inclusion in this section.

Manufacturing has recently become more automated with the addition of robotic manipulators and other mechanical devices configured to autonomously perform various functions associated with the production of goods. Operations during the course of manufacturing may require a robotic manipulator to function in multiple degrees of freedom. Thus, robotic manipulators are often created using several components ranging in size and connected together to enable desired movement and operation. As such, factory production of robotic manipulators usually involves each manipulator completely assembled due to the complexity involved with connecting and securing its components. These pre-assembled robotic manipulators can be difficult to transport since the manipulators may be transferred as a single heavy, bulky assembly due to the difficulty associated with disconnecting and reconnecting robotic components.

SUMMARY

In one example, an assembly may comprise a first link having a circular planar surface comprising a first plurality of structural features positioned incrementally at respective positions proximal to an outer edge of the circular planar surface for coupling the first link with a corresponding link in a fixed geometric configuration and a first plurality of electrical components positioned proximal to a center of the circular planar surface for enabling one or more electrical connections with the corresponding link. The assembly may also comprise a second link having a circular planar surface comprising a second plurality of structural features positioned incrementally at respective positions proximal to an outer edge of the circular planar surface for coupling to the first plurality of structural features to couple the second link with the first link in the fixed geometric configuration such that an orientation of the second link relative to the first link is uniquely defined in an immovable position and a second plurality of electrical components for coupling with the first plurality of electrical components of the first link to provide one or more electrical connections between the first link and the second link when the first link and the second link are coupled in the fixed geometric configuration. The assembly may further comprise a clamping component comprising respective channels for coupling around respective outer surfaces of the first link and the second link when the first link and second link are coupled in the fixed geometric configuration in a manner such that the clamping component secures the orientation of the second link relative to the first link in the immovable position.

In another example, an assembly may comprise a first link having a circular planar surface comprising a ring structure extending from the circular planar surface for coupling to respective inner surfaces of a through hole of a corresponding link and a first plurality of structural features including one or more pins and one or more slots positioned incrementally at respective positions proximal to an outer edge of the circular planar surface for coupling with the corresponding link in a fixed geometric configuration. The assembly may also include a second link having a circular planar surface comprising a plurality of corresponding structural features having respective slots for coupling with the one or more pins and respective pins for coupling with the one or more slots of the first link to couple the second link with the first link in the fixed geometric configuration such that an orientation of the second link relative to the first link is uniquely defined in an immovable position and a through hole for coupling around the ring structure extending from the circular planar surface of the first link when the first link and the second link are coupled in the fixed geometric configuration.

In another example, a robotic device may comprise a robotic manipulator including a first link having a circular planar surface comprising a ring structure extending away from the circular planar surface, and the ring structure includes one or more channels extending around the ring structure and one or more planar regions positioned in between the one or more channels. The robotic device may also comprise a base including a second link having a circular planar surface comprising a corresponding ring structure extending away from the circular planar surface, and the corresponding ring structure includes one or more channels extending around the corresponding ring structure and one or more planar regions positioned in between the one or more channels. The robotic device may comprise a clamping component having respective extensions for coupling to respective channels of the first link and the second link and respective planar regions for coupling to respective planar surfaces of the first link and the second link in a manner that couples the first link with the second link in a fixed geometric configuration such that an orientation of the second link relative to the first link is uniquely defined in an immovable position.

These as well as other aspects, advantages, and alternatives, will become apparent to those of ordinary skill in the art by reading the following detailed description, with reference where appropriate to the accompanying figures.

DETAILED DESCRIPTION

Figures 1A, 1B:
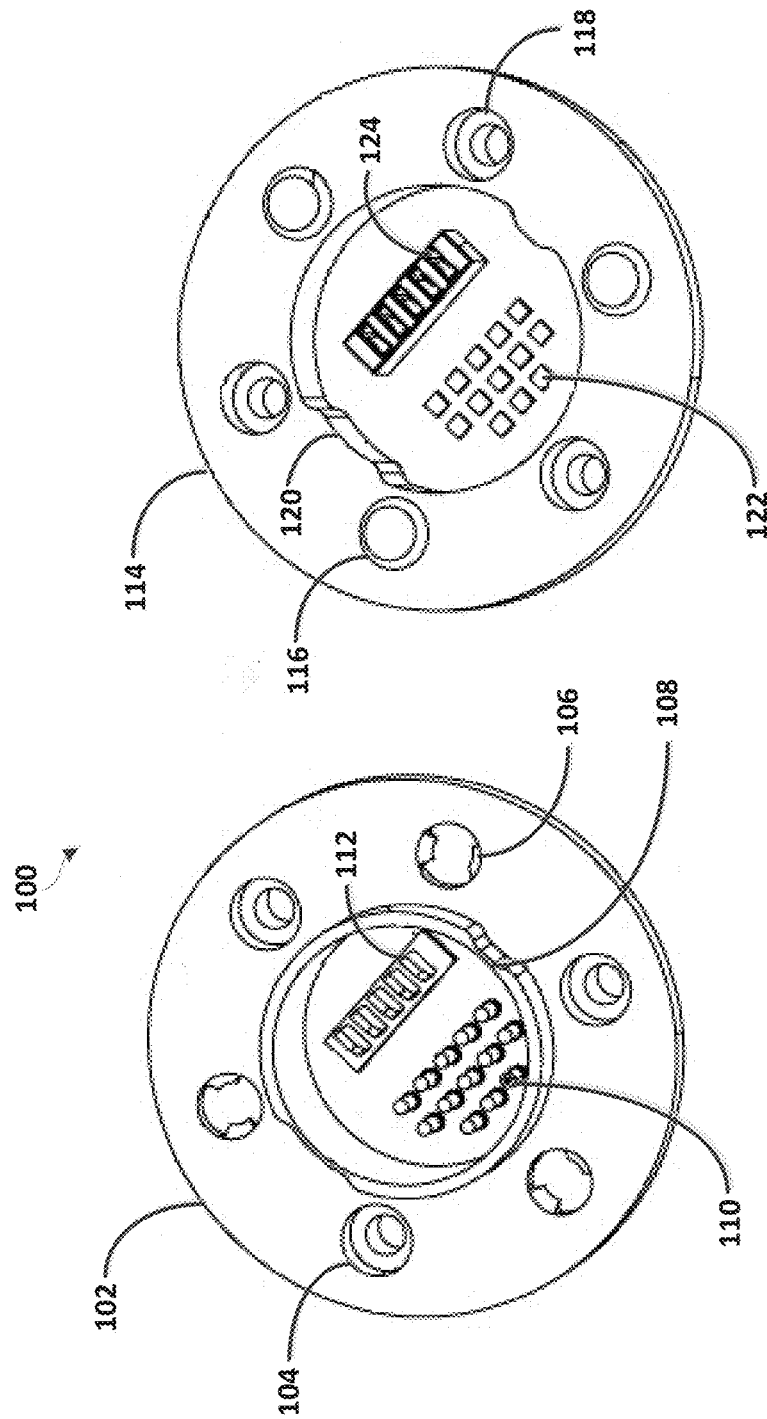
FIG. 1A-1B illustrates an example assembly including a set of connection links for precisely connecting robotic components within a robotic manipulator.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a robotic manipulator or other type of robotic component or device may be formed through an assembly of multiple components together in a mechanical design that enables the robotic manipulator to perform various functions, such as load displacement. A robotic manipulator may include specialized components arranged in a predefined design to enable different operations, including performing tasks related to manufacturing. In order to increase mechanical stability and ensure components operate according to designs, the various components of the robotic manipulator may be connected using example assemblies configured to arrange components in a fixed geometric configuration that prevents any unwanted movement between components. Further, assemblies that allow the connection and disconnection of robotic components may also enable a user to quickly replace worn-out or malfunctioning robotic components without having to replace the entire robotic device. Within example embodiments, example assemblies may include various components configured to secure connections between components while enabling predefined operation and movement of the components within the robotic entity.

In some example embodiments, an assembly may include one or multiple sets of connection links that are designed to precisely lock together in a sturdy, fixed configuration. The connection links may directly link robotic components together and may be configured with structural features that secure an assembly of the connection links in an interlocked form that prevents unwanted movement between the robotic components and stabilizes the robotic components according to the robotic manipulator's design. For example, a set of connection links may link at six contact areas arranged at various points on the connection links configured to align and secure the connection links together. Structural features for linking together connection links may be incrementally spaced on each connection link in a way that may maximize the durability and strength of the assembly enabling the robotic components to connect to perform mechanical operations. In some instances, the connect links may use additional components to lock robotic components together in a fixed geometric configuration that prevents any erroneous movement outside the desired mechanical operation designed for the assembly of the robotic components.

Furthermore, the connection links may be configured or designed to improve the assembly and disassembly process of connecting robotic components within a robotic manipulator. The connection links may be configured to allow a user to easily assemble and disassemble connections between components within the robotic manipulator by a user, which may involve the user taking apart or putting together robotic components by hand or handheld tools, for example. The components within an assembly for linking robotic parts may be designed to enable a user to take apart the entire robotic manipulator for changing its location and reassembling the robotic manipulator to the same extent of durability and operation. Configuring the connection links that assemble robotic components to easily connect and disconnect by a user may enable the easy transportation of the robotic manipulator between locations without requiring the robotic manipulator to be moved in a completely assembled form.

In one example embodiment for assembling components of a robotic manipulator, an assembly may include one or multiple sets of connection links with respective connection links that are configured to join together in a fixed geometric configuration. The connection links may link at one or multiple mechanical features of the connection links configured to prevent rotation or other movement between the connection links during assembly. Assembling the connection links together may secure robotic components within a robotic manipulator together in a predefined-mechanical configuration. That way, the robotic components may form the robotic manipulator and enable it to perform various functions, including moving various loads or performing different operations.

The connection links for mechanically connecting robotic components may be configured as circular surfaces with one or multiple structural features for securing the connection links together precisely. The various structural features for connecting the set of the connection links together may be positioned at various points on the connection links. For example, the connection links may each respectively include different slots, pins, or other structural features for linking the connection links precisely together with the different structural features positioned incrementally near the outside edge of the connection links. As indicated, the structural features may have various forms or designs, including, but not limited to holes, slots, pins, and/or other mechanical features that secure and enable a fixed connection between the connection links and additionally robotic components linked to the connection links.

Furthermore, an example assembly of components for connecting parts of a robotic manipulator together may also include a clamping component(s) configured to secure the assembly of components together. The clamping component may apply axial force upon portions of the components within the assembly to secure and provide stability to the connection between parts within a robotic manipulator. The clamping component may include multiple parts and may be configured to be placed on and off of the assembly by a user or other robotic device.

In some example configurations, an assembly for connecting robotic parts within a robotic manipulator may also include electrical components or mechanical features (e.g., open slots) that allow electrical connections to be established between the robotic components. In some instances, connection links may be configured with various electrical components that may engage in electrical connections, which may enable robotic components to engage in electrical communication as well. Robotic components may be capable of communicating and transferring data through assemblies enabling precise connection. The electrical components may be positioned at various points on the connection links (e.g., close to the center of the links). Robotic components within a robotic manipulator may also include electrical components that connect through slots or other mechanical features of the connection links.

Further, in some example embodiments, an assembly for connecting components within a robotic device may be configured to allow the transfer of fluids between the robotic components. The assembly may include various components, including o-rings and tubes, which may structurally enable the transfer of fluids between robotic components without loss. Different structures and connection techniques may be structurally included within example assemblies to enable the transfer of fluids as well.

In another example embodiment for securely connecting robotic components together within a robotic manipulator, an example assembly may include a set of connection links with circular planar surfaces that have a ring structure extending from the approximate center of the surface. Each ring structure of the connection links may cover a large area of the connection link and may include channels or inward extensions positioned around the outside surface of the ring structure with planar (e.g., flat) regions positioned in between the channels on the outside surface of the ring structure. The channels and flat regions positioned on the outside surface of the ring structure may assist in aligning the connection links in a precise manner when the assembly mechanically links the robotic components. As such, the ring structures may include other mechanical forms that may assist a user in aligning and linking the connection links together during assembly of the robotic components.

The example assembly may also include a clamping component configured to align and secure the connection links based on joining and linking to channels and planar regions of the ring structures. The clamping component may further secure the ring structures as well as the connection links together in a fixed geometric configuration that prevents any movement between the links based on aligning the ring structures according based on the channels and/or other features. With the force of the clamping component, the connection links may lock together and hold the robotic components together without allowing unwanted movement between the robotic components. The example assembly may include other components as well.

Furthermore, other example assemblies or components for connecting parts of a robotic manipulator may exist. The assemblies may be configured and designed based on the position of the connection within the robotic manipulator and may include components enabling assembly and disassembly of the robotic manipulator.

Referring now to the figures, FIG. 1A-1B illustrates an example assembly including a set of connection links for precisely connecting robotic components within a robotic manipulator. The assembly may include components that enable linking multiple parts of a robotic manipulator together in a predefined mechanical configuration. The stability and precision of the assembly may enable the connected robotic components to function according to a mechanical design of the robotic manipulator without unwanted movement between the robotic components.

FIG. 1A shows an example connection link for precision assembly of robotic components. As illustrated, the example connection link 102 includes structural features for engaging in a secure link with another connection link. The structural features may include one or more through holes (e.g., through hole 104) and one or more shaped cones (e.g., shaped cone 106) positioned and used for securing the connection link with another in a fixed geometric configuration. Additionally, the connection link 102 also includes a ring structure 108 as well as multiple pogo pins 110 and blades 112 for establishing electrical connections with the corresponding connection link.

As shown in FIG. 1A, the connection link 102 has a circular planar surface with structural features positioned incrementally nearby the edge of the circular planar surface. The connection link 102 may exist as a circular planar structure or may exist as other structures within examples. In particular, parameters of a connection link may vary depending on the purpose of the connection link within a robotic device's design. For example, connection links that may join together large robotic components may have a larger size or structure. Furthermore, connection links may exist as other structures, such as rectangular or triangular structures, etc. The connection link 102 may be configured with different materials, including but not limited to metals, plastics, etc. As such, the connection links 102 may be configured to precisely connect on its flat surface with a flat surface of a corresponding link.

As indicated, the connect link 102 includes structural features positioned at various points on the connection link 102 for securing a connection with another connection link. As such, the spacing and positioning of the structural features may vary within other example implementations. Additionally, the connection link 102 may include more or less structural features positioned at different positions in other examples. The connection link 102 may be configured to assist with securing and mechanically connecting robotic components within a robotic entity. Within other examples, the connection link 102 may include more or less components as well.

The structural features may be positioned on the connection link in a manner that allows a precise connection between connection links that prevents any unwanted movement between the connection links. That way, the structural features of connect links may securely lock robotic components together in an operational mechanical configuration. As shown in FIG. 1A, the structural features of connection link 102 includes a threaded hole 104 and shaped cone 106, but may include other types of structural features as well. For example, a connection link may include blind holes, pins, slots, through holes, screw threads, and/or other mechanical features for establishing a precise connection with another connection link. Additionally, the spacing and total number of structural features of the connection link 102 may vary within other examples. The spacing of the structural features may depend on the size of the robotic components, the position of the connection links on the robotic manipulator, or the overall purpose of the connection links, for example. Other examples may impact the number and spacing of the structural features on a connection link as well.

The threaded hole 104 of connection link 102 may function as fastening means for connecting with another connection link of another robotic link. In some instances, a connection link may include one or multiple threaded holes positioned at various positions on the link. The threaded holes may correspond to other pins, slots, holes of a corresponding connection link and may align when the connection links are coupled together. Furthermore, the threaded holes may vary in types, which may include the connection link having threaded holes, such as blind, bottom, obstructed, open, recessed, stepped, and/or through threaded holes, etc. Other types of threaded holes may be used as well.

The shaped cone 106 may function to assist in connecting the connection link 102 with another connection link. Similar to the threaded holes, the shaped cone 106 may interlock with a corresponding structural feature of a corresponding connection link during assembly. As shown in FIG. 1A, the connection link 102 may include multiple shaped cones positioned incrementally around at different points of the connect link 102. For the structural features, including the threaded holes and shaped cones may be connected via various means, including bolts or screws, for example. In some instances, shaped cones of a connection link may make contact with a tapered peg at two points, for example.

The ring structure 108 extending from the surface of the connect link 102 may assist in establishing a precise connection with a corresponding link. The ring structure 108 may insert into a pocket structure of a corresponding link and connect to multiple sides of the pocket structure. In some instances, the ring structure may precisely fit within the pocket structure to prevent movement between the connection links when the connection links are assembled together. Additionally, the ring structure 108 may include a groove, rigged extension, flat surface, or other structural feature that may assist in aligning and interlocking the ring structure 108 within a corresponding pocket structure of another connection link. For example, the ring structure 108 may include a flat region on its outside surface that may be configured to align and engage with a flat region of a circular inner surface of a pocket structure of a corresponding connection link. Furthermore, the parameters (e.g., size, height) as well as the contour of the ring structure 108 may vary within examples. In some instances, the contour of the ring structure 108 may be irregular to key the orientation during insertion.

In addition, the connection link 102 may include electrical components configured to establish electric connections with another connect link or between components of a mechanical entity. The electrical connections may enable robotic links mechanically joined operationally together by the connection links to communicate via electric signals, which may include the transmission of power and control signals. As such, the various electrical connections may be configured to carry sufficient power for all subsequent robotic links to function properly from an initial power source, for example. Further, the electrical connections may be configured to carry signal protocols for control, sensing, and other possible purposes. The electrical components may be configured to easily connect during assembly and disassembly processes, which may involve connecting and disconnecting electrical components multiple times with minimal to no special consideration by a user.

The pogo pins 110 may enable the connection link 102 to establish electric connections with a corresponding connection link, other robotic links, etc. In particular, the pogo pins 110 may serve as components to enable connection between multiple printed circuit boards (PCBs). In the example embodiment shown in FIG. 1A, the connection link 102 includes multiple pogo pins 110, but may include more or less pogo pins in other examples. In some instances, respective pogo pins may have a slender cylindrical form containing sharp, spring-loaded pins. The sharp points positioned at ends of the pogo pin may secure contacts with another circuit and thereby connecting them to enable electrical exchange. The pogo pins 110 may be arranged in a dense array to connect many individual nodes of circuit boards, for example.

When used in some applications, such as high performance applications associated with robotic manipulators, the respective pogo pins 110 may involve a careful design configured to allow not only high reliability across many mating/unmating cycles but also high-fidelity transmission of the electrical signals. The pins themselves may be structurally hard and may include a substance plated on the pings (such as gold) that provides for reliable contact. Within the body of the pogo pin, the pins may establish good electrical contact with the body and the spring may carry the signal (along with the undesirable inductance that the spring represents). The design of pogo pins to be used in matched-impedance circuits may maintain the correct characteristic impedance and may be arranged with one signal-carrying pin surrounded by four, five, or six grounded pins, for example.

The blades 112 may connect to spring receptacles or other electrical components to also create electrical connections between connection link 102 with another connection link or enable components to engage in electrical communication. A blade connector may function as a type of single wire connection using a flat conductive blade, which may be inserted into a blade receptacle. The blade connectors and blade receptacles may have wires attached to them either through soldering of the wire to the blade or crimping of the blade to the wire. In some examples, the blades 112 may enable different types of electrical connections between robotic links that the pogo pins may not be configured to establish. Further, the blades 112 may serve for higher current power transmission. The springs, pogo pins, and/or other electrical components may be configured to transmit control, sensors, and/or other communication busses. In addition to the shown connectors, the connection links may further include other connections, such as PCB edge connectors.

Additionally, in other example embodiments, the connection link 102 or other example components within the assembly may include other types of electrical connectors, which may be configured as electro-mechanical devices for joining electrical circuits as an interface using a mechanical assembly. The electrical connections may be configured to enable easy connection by a user between connection links and/or robotic parts. The different electrical connections may be temporary for portable equipment (e.g., robotic parts) or may serve as permanent electrical joints between robotic devices, for example. The electrical connectors may vary by their pinout and physical construction, size, contact resistance, insulation between pins, ruggedness and resistance to vibration, resistance to entry of water or other contaminants, resistance to pressure, reliability, lifetime (number of connect/disconnect operations before failure), and ease of connecting and disconnecting. In some instances, the different electrical connections may be keyed to prevent insertion in the wrong orientation, connecting the wrong pins to each other, and/or have locking mechanisms to ensure that electrical connections are fully inserted and cannot work loose or fall out. Some connectors may be designed such that certain pins make contact before others when inserted, and break first on disconnection. In some cases, this may protect circuits typically in connectors that apply power, e.g. connecting safety ground first, and sequencing connections properly in hot swapping applications.

The connection links, such as connection link 102 may include connections that are easy to identify visually, rapid to assemble, may require only simple tooling, and may be inexpensive. In some cases, a connection link may include electrical connections that enabled control of what may be connected. Some of the electrical connections may be keyed with some mechanical component which prevents mating except with a correctly oriented matching connector. Likewise, some connector housings of electrical connections may be designed with locking mechanisms to prevent inadvertent disconnection or poor environmental sealing. For example, locking mechanism designs may include locking levers of various sorts, screw locking, and toggle or bayonet locking.

FIG. 1B illustrates another example connection link for engaging in a precise assembly with the connection link of FIG. 1A. Similar to the connection link 102 shown in FIG. 1A, the connection link 114 includes multiple structural features for engaging in a connection with the connect link 102 in a fixed geometric configuration. The connection link 114 includes one or more tapered pegs, such as tapered peg 116, and one or more through holes, such as through hole 118. Additionally, the connection link 114 includes a pocket structure 120 for receiving an insertion of the ring structure 108 of the connection link 102 and various electrical connections on a bottom surface of the pocket structure 120. The various electrical connections further includes foil pads 122 configured on a printed circuit board (PCB) and one or more sets of spring receptacles 124.

The connection link 114 shown in FIG. 1B exists as a circular planar surface, but may have a different structure within other examples. For example, the connection link 114 may have a rectangular structure or exist as some other form. Additionally, the size and/or other parameters of the connection link 114 may vary within examples. Further, the connection link 114, similar to the connection link 102 of FIG. 1A, may be made up of various types of materials, including, but not limited to, metals, plastics, or a combination of materials. As shown in FIG. 1B, the connection link 114 is configured as approximately the same size of connection link 102. In other examples, the connection links may have different sizes comparatively.

The structural features for joining the connection link 114 to other connect links (e.g., connection link 102) may include exist as various mechanical features. As previously indicated, precision alignment between the connections links may be based on the engagement of the contact areas. In some instances, the structural features may include magnetic components that assist with securing a connection between robotic components. For example, the structural feature may include one or multiple tapered pegs configured to couple to corresponding structural features of another connection link. Within example implementations, the tapered pegs, such as tapered peg 116, may vary in size and position.

The through hole 118 may serve as mechanical connections to secure connection links in the immovable geometric configuration that locks the connection links together in a fixed format. The through holes of connection link 114 may align with through holes or other structural features of connection link 102 and be connected with screws, bolts, or other fastening means. Other structural components may assist in interlocking the connection links to securely configure robotic components together within a robotic manipulator.

The pocket structure 120 (also known as a mating pocket) may serve as a structure for receiving an insertion of an extending ring structure from another connection link, such as extending ring structure 108 from connection link 102. The pocket structure 120 may include corresponding regions, such as a flat region or mechanical extensions to align the insertion of ring structure 108 from the connection link 102 when the connection link 102 and connection link 104 are secured in the fixed geometric configuration. The pocket structure 120 may vary in size, which may depend upon the size of the ring structure of a corresponding link within an assembly for linking robotic components. In some instances, the pocket structure 120 may have an irregular contour to assist in alignment with the ring structure 108 of the connection link 102. Additionally, the pocket structure 120 may be larger than the ring structure to assist in merely initial alignment, but also prevent jamming between the connection links.

The electrical connections, including the foil pads 122 on the PCB and the spring receptacles 124 may serve as connections between the connection link 114 with another connect link, such as connection link 102 of example potential assembly 100. The electrical connections may establish electrical connections between robotic links assembled by the connection of the connection links. As such, the PBC may mechanically support and electrically connect electrical components (e.g., foil pads 122, spring receptacles 124) of the connection link 114. The PCB may mechanically support and electrically connect electrical components using conductive tracks, pads, and other features etched from copper sheets laminated onto a non-conductive substrate. The PCB may be configured as a single sided, double sided, or multi-layer board, for example. The foil pads 122 may be configured on the PCB and may also connect the spring receptacles 124. The spring receptacles 124 may connect to the blades 112 to provide electrical connections between components.

Additionally, the connection links may include a clamping force from another component, which may constrain the connection links both in translation and rotation. The contact areas, which may be designated by the structural features, may assist in allowing tolerances of the machining process while still providing highly precise alignment. The positioning of the structural features as well as the designs of the connection links may be based on Kinematic and/or Quasi-Kinematic coupling designs. Kinematic coupling can be used to describe fixtures designed to exactly kinematically constrain components. For example, a canonical example of a kinematic coupling includes three radial v-groves in one part that mate with three hemispheres in another. Each hemisphere may have two contact points for a total of six contact points, enough to constrain all six of the part's degrees of freedom. In some embodiments, the structural features may be positioned based on Kinematic and/or Quasi-Kinematic coupling designs.

In another example embodiment, other designs of connection links may exist that involve small contact areas occurring between the connection links despite one or both surfaces of the connection links not being perfectly planar. The connection links may include a single type of structural feature for securing a connection or may include other types of structural features. Furthermore, the connection links may include extruded rings or mating pockets for providing alignment and serving as a guide during connection. The extruded rings and/or mating pockets may prevent improper connection between the connection links, but guide a use to connect the connection links properly according to the structural features.

Figure 2B:
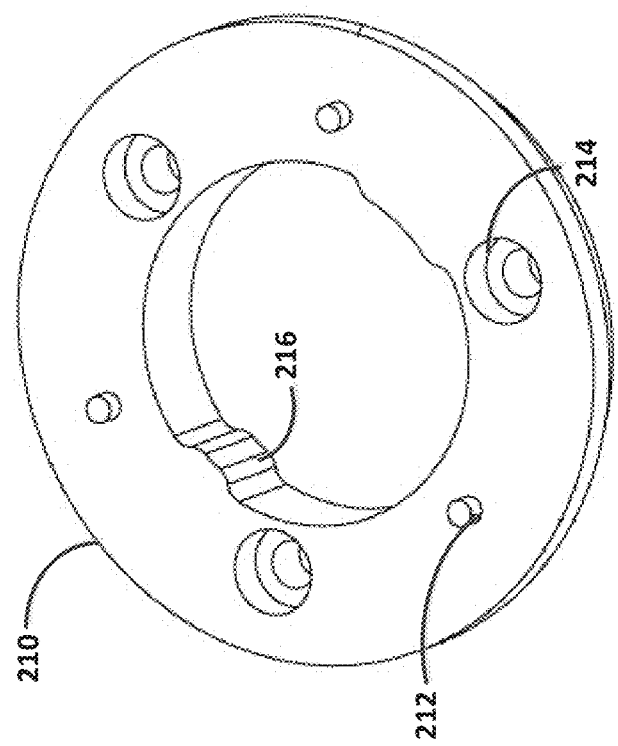
FIGS. 2A-2B illustrate another example assembly for mechanically linking components of a robotic manipulator.
Figure 2A:
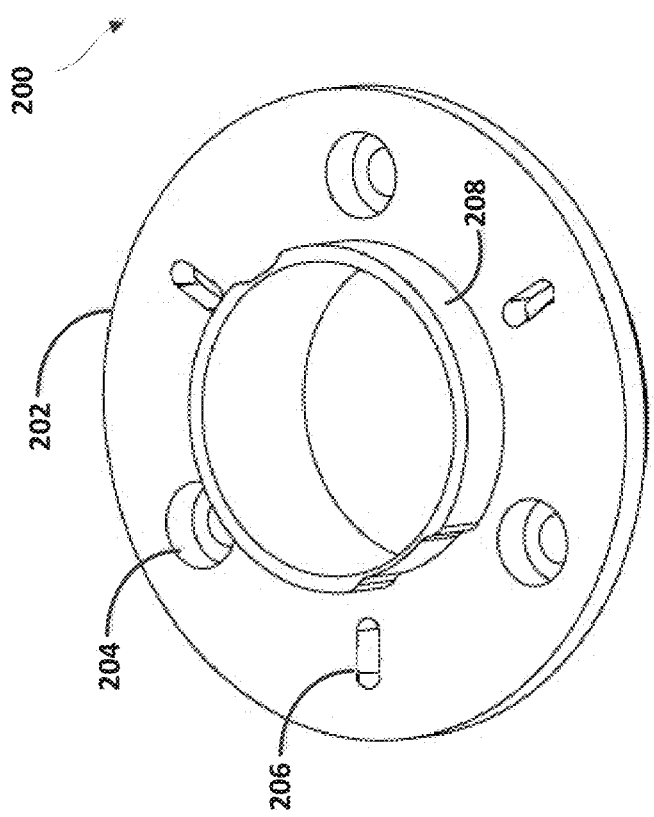

FIGS. 2A-2B illustrate another example assembly for mechanically linking components of a robotic manipulator. The example assembly 200 includes various components, including a set of connection links configured to link via structural features to enable robotic components to operate together without unwanted movement between the links. Further, the example assembly 200 may serve to connect parts of a robotic device, a robotic manipulator to a base or other structure, or to establish other connections, for example. The example assembly 200 may include additional components in some implementations, such as a clamping component or other structural feature configured to secure robotic links together in a predefined configuration.

FIG. 2A illustrates an example connection link for precision connection of robotic components in a robotic manipulator. The connection link 202 shown in FIG. 2A includes three slots, such as slot 206, but may include more or less slots within other examples. Further, the connection link 202 also includes three threaded holes, such as threaded hole 204, but may include more or less threaded holes within other examples. The connection link 202 also includes a ring structure 208 that may assist with connecting and aligning the connection link 202 with a corresponding link within the example assembly 200.

The connection link 202 is shown as a circular structure, but may include other structures within other examples. Likewise, the parameters, such as the size of the connection link 202 may vary in some implementations. As indicated above, the connection link 202 includes structural features positioned incrementally nearby the outside edge of the connect link 202. The structural features include slots (e.g., slot 206) and threaded holes (e.g., threaded hole 204) alternating at various points in a circular manner on the surface of the connection link 202. In other example embodiments, the structural features may be positioned differently on the connection link 202. Further, the connection link 202 may include more or less structural features, including different types of structural features for securing the connection link 202 in a precise, fixed geometric configuration with another connection link.

The ring structure 208 is shown positioned at the approximate center of the connection link 202, but may be positioned at different points of the connection link in other examples. Furthermore, the ring structure 208 is shown in FIG. 2A encircling a through hole of the connection link 202. In some instances, the connection link 202 may not include the through hole positioned inside the ring structure 208. Furthermore, a connection link may include multiple ring structures, which may exist in different forms for engaging in a link with a corresponding connection link. Example connection links may include ring structures that vary in size, material, and/or other parameters as well.

Additionally, the ring structure 208 includes perforated portions that may be used to align the connection link 202 with perforated portions of a pocket structure of a corresponding link. The ring structure 208 may insert into a pocket structure and assist in structurally supporting the assembly together. Other examples of ring structure or other extensions may assist in connecting the connection link 202 as well.

FIG. 2B illustrates another example connection link for engaging in a precise assembly with the connection link of FIG. 2A. As shown, the connection link 210 includes pins 212, and threaded holes 214, which may align and link with the connection link 202 of the example assembly 200. Additionally, the connection link 210 also includes a large through hole 216 positioned in the center of the connection link 210 configured to receive and connect with the extending ring structure 208 of the connection link 202. Within other example implementations, the connection link 210 may include more or less components that may secure a connection between the connection link 210 and connection link 202.

The pins 212 may be positioned at various places on the surface of the connect link 210. The pins 212 may insert into corresponding slots when the connection link 210 is aligned and connected to the connection link 202. The pins 212 inserting into slots of the connection link 202 may prevent movement between the connection links. As such, the connection links may secure components of a robotic manipulator or other entity together in a predefined operational configuration. In some instances, the pins 212 may be positioned spatially at different points on the connection link 212.

The threaded holes 214 may be positioned at various points on the surface of the connect link 210. The threaded holes 214 may link with corresponding structural features of the connection link 202 for joining the connection links. Within other examples, the position, size, and/or other parameters associated with the threaded holes 214 may vary. The position of the threaded holes may vary within examples.

The through hole 216 may be configured to receive an insertion of the ring structure 208 from the connection link 202. The through hole may include the same physical features (e.g., perforated portions) that may enable the ring structure 208 to align and lock in place with the through hole 216. In other examples, the size and/or position of the through hole 216 may differ relative to the connection link 210.

Figure 3B:
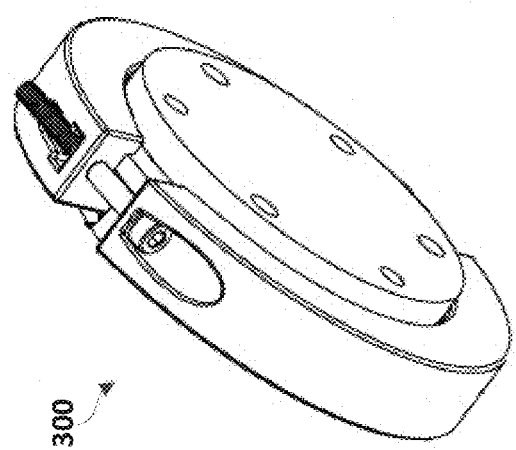
FIG. 3B illustrates an assembled view of the example assembly for linking robotic components shown in FIG. 3A.
Figure 3A:
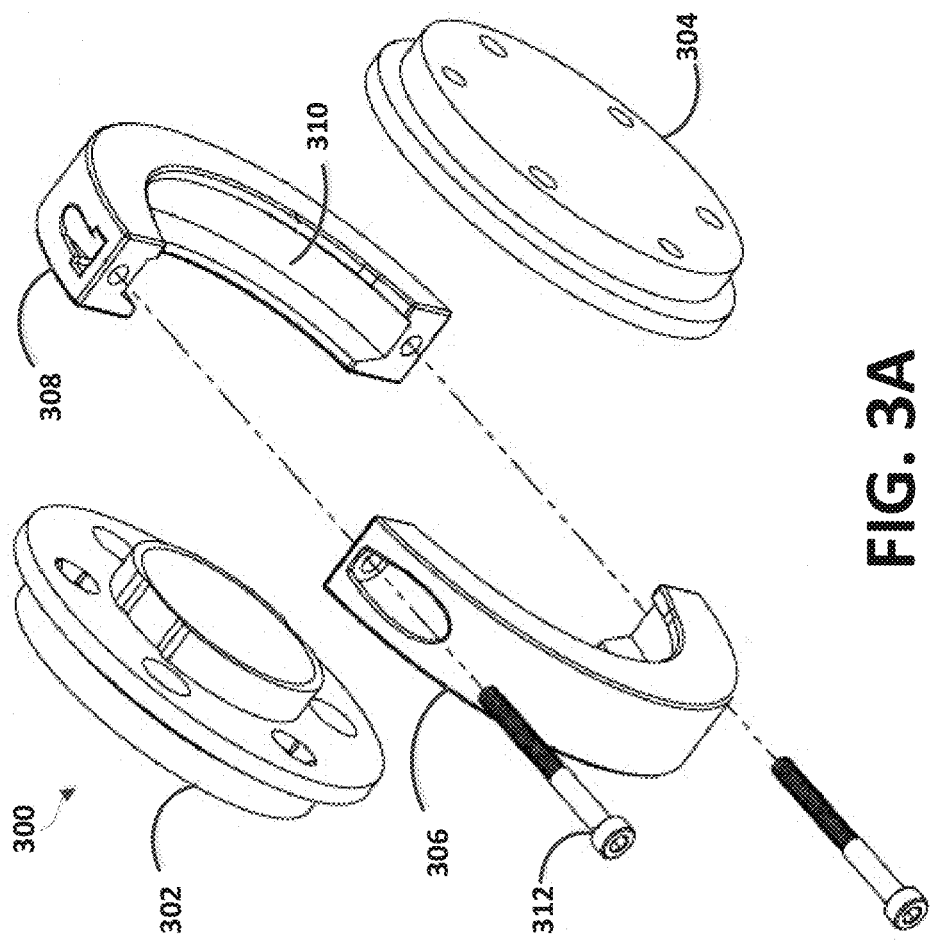
FIG. 3A illustrates an exploded view showing components of an example assembly for linking robotic components.

FIG. 3A illustrates an exploded view showing components of an example assembly for linking robotic components. In particular, the example assembly 300 includes connection links 302-304, a set of clamping components 306-308 with engaging surfaces (e.g., surface 310) for configuring around the connection links 302-304 to secure the assembly 300 together. Additionally, the example assembly also includes screws (e.g., screw 312) for holding the clamping components 306-308 properly together to ensure the connection links 302-304 remain in a fixed configuration that links robotic components together without allowing any unwanted movement between the robotic components during operation.

The connection links 302-304 may be configured to link together, which may include assistance from clamping components 306-308. Within example implementations, the connection links 302-304 may connect to separate robotic components that may make up a portion of a robotic device. For example, connection link 302 may be configured to attach or built directly with a robotic component and connection link 304 may attach to a different robotic component. As such, an assembling of a robotic device (e.g., robotic manipulator) may involve connecting the robotic components together through joining the connection links 302-304 together.

In order to connect the connection links 302-304 together, the connection links 302-304 may include respective structural features, such as tapered features on respective ends of the connection links to assist with the connection. The tapered features may be used both for self-alignment and for generating the necessary clamping forces to hold the two connection links together. Furthermore, the connection link 302 includes a ring structure extending from a surface of the connection link 302. During assembly, the ring structure may insert into a pocket structure of the connection link 304, which may align the connection links 302-304 in a predefined, fixed configuration. Further, the connection links 302-304 may include additional components that may assist in aligning the connection links 302-304 together in a proper configuration for linking robotic components within a robotic manipulator.

Further, the example assembly 300 includes multiple clamping components 306-308. In some instances, an assembly for linking robotic components may include more or less clamping components. As such, the clamping components 306-308 shown in FIG. 3A may secure the connection links 302-304 together in the fixed geometric configuration, which may be capable of bearing a load within a robotic device. The clamping components 306-308 may be coated with a slippery material, such as polytetrafluoroethylene (PTFE) coating. The slippery material may increase the clamping force provided upon the connection links 302-304 or may extend the usability of the clamping components 306-308 for repeated assembly and disassembly operations. Additionally, the clamping components 306-308 may be machined or molded directly into clamshell housing or on both sides of a monolithic block. For an example clamshell design, the clamping components 306-308 may include tapers configured during a single machining operation.

In some example implementations, the clamping force may be generated by pulling the clamping components 306-308 together, either by using a screw or a pull action toggle clamp for assembly without tools. Positive locking and resistance to rotation may be achieved by the flat trailing edges of the tapered profile. The tapered profile may be optimized to generate a desired clamping force between the connection links. The tapered profiles may become a physical part of the link housing, which may increase the rigidity of the overall mechanical connection by removing bolts and stress concentrations.

As shown, the clamping components 306-308 include inner surfaces (e.g., surface 310) configured to attach to the outer surfaces of the connection links 302-304. The surfaces may be configured to directly fit around the connection links 302-304 to prevent movement between the clamping components 306-308 and the connection links 302-304. The clamping components 306-308 may function as collars with internal angled profiles (e.g., surface 310) that may push against the matching angled profile of connection links. This may generate radial force into an axial clamping force that secures the link between the connection links. Additionally, this may include additional features to make the end-user experience more pleasing, such as the ability to remain fixed to one side to remove the need to hold the connection links in addition to the clamp. The clamping components 306-308 may function as a shaft-collar design, which may use an over center latch. The over center latch may also be configured to be used axially without the shaft collar, for example. Similarly, a simple bolt circle may be used connecting the connect links via standard bolts.

Further, the assembly 300 shows screws (e.g., screw 312) that may be used to hold clamping components 306-308 together around the connection links 302-304. The screw 312 represents one possible means for connecting the clamping components 306-308 together in an immovable configuration that secures the connection links 302-304 together. The clamping components 306-308 may be configured to enable a user to hand screw the screws to hold together the clamping components 306-308 together. The clamping components 306-038 may be configured to generate enough force to keep the connection links and robotic parts together under a load. In other example embodiments, other types of fasteners may be used. For example, in one example, the clamping components or other components of the assembly may be secured by fasteners with a tapered shank. Similarly, fasteners with a non-tapered shank (e.g., bolts) may be used as well as a combination of different fasteners, etc. Other mechanical structures not described herein may be used to secure clamping components 306-308 together as well.

In some instances, the assembly may represent a portion of a robotic device that may include a base that includes portions of the assembly as well as a robotic manipulator that may include other portions of the assembly. The robotic device may include multiple parts (i.e., components) that may be connected by connection links, clamping components, and/or other assembly parts that may enable a precise, stable connection. The robotic device may be capable of being assembled and unassembled by a user and may further operate properly, including being configured to move loads, perform functions, etc.

FIG. 3B illustrates an assembled view of the example assembly for linking robotic components shown in FIG. 3A. The assembled view shows the connections links 302-304 secured in a fixed geometric configuration that prohibits any movement between the components within the assembly 300. As shown, the connection links 302-304 may connect robotic components together for engaging in mechanical and electrical operation. For example, the assembly may enable the robotic components to move together according to the mechanical connection between the components. Additionally, the assembly may enable electrical communication between multiple components of a robotic device. The assembled view illustrates the clamping components 306-308 engaging and securing the connection links 302-304 together in the fixed geometric configuration.

Figure 4A:
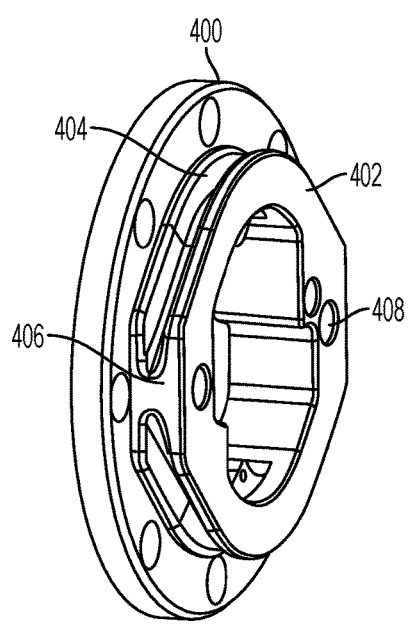
FIG. 4A illustrates another example connection link for precision connection of robotic links within a robotic manipulator.

FIG. 4A illustrates another example connection link for precision connection of robotic links within a robotic manipulator. Similar to other types of connection links, the connection link 400 shown in FIG. 4A includes a ring structure 402 that extends from the connection link's surface. The ring structure 402 includes multiple channels (e.g., 404) extending around its outside surface and planar surfaces (e.g., planar surface 406) positioned on the ring structure's outside surface between the multiple channels. Additionally, the ring structure 402 also includes structural features, such as structural feature 408, which are positioned on the top planar-surface of ring structure and may further align and/or secure the connection link 400 to a corresponding connection link to secure robotic components in a fixed configuration.

The connection link 400 has a circular structure in the example shown in FIG. 4A, but may have a different shape/structure in other examples. Similarly, the size and/or other parameters of the connection link 400 as well as components of the connection link 400 may vary within examples configurations of the connection link 400. The connection link 400 may include one or multiple materials, such as metals, plastics, etc. Furthermore, the connection link 400 may be created entirely in a single machine process during manufacturing or may require the assembly of multiple components to create.

The ring structure 402 is shown extending from the approximate center of the circular structure of the connection link 400, but may extend from other portions of the connection link 400 within other examples. Furthermore, the diameter, depth, and other parameters of the ring structure 402 may vary within implementations. The ring structure 402 may be coupled to the connection link 400 via fastening means (e.g., screws, bolts) or may be created together with the connection link 400 during manufacturing, for example.

The channels, such as channel 404, extending into the outer surface of the ring structure 402 may vary in position, depth, length, and/or other possible parameters. The channel 404 may serve as an insertion for receiving extensions from clamping components that may secure the ring structure 402 as well as the entire connection link 400 in place. The channels may be designed to ensure a tight fit between a clamping component and the connection link 400 to prevent any unwanted movement from the fixed geometric configuration. That way, the connection link 400 may secure any robotic components connected to the connection link 400 in a secure and precise manner.

Additionally, the planar surface 406 and other planar surfaces positioned on the outside of the ring structure 402 may assist in securing the connection link 400 in a fixed geometric configuration with another connection link. A clamping component may have a corresponding flat surface for ensuring a tight coupling with the planar surface of the ring structure 402, which may prevent slippage or other unwanted movement (e.g., rotation between links).

Furthermore, the ring structure 402 may also include structural features on the top surface to engage with structural features of a corresponding link. The structure features, such as structural feature 408, may include slots or pins for enabling precise connection of the connection links. Other structural features, including the ones previously discussed herein, may be used within example implementations.

Figure 4B:
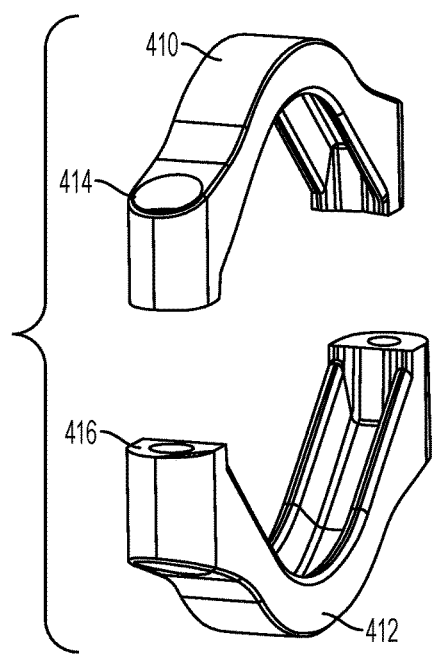
FIG. 4B illustrates example clamping components that may secure connection links together within a precise assembly of robotic links.

FIG. 4B illustrates example clamping components that may secure connection links together within a precise assembly of robotic links. As shown, an example clamping component may include multiple components, which may be used for efficiently securing connect links together within a robotic manipulator. In the example embodiment illustrated within FIG. 4B, the clamping components 410-412 may secure connection links together and prevent any unwanted movement. The clamping components 410-412 include structural features 414-416 for securing the clamping components 410-412 together. The clamping components may be connected at the structural features 414-416 using any fastening means.

Within some examples, an example clamping component may be configured to facilitate an axial clamping force upon the connection links. For example, the components may be configured to enable a typical end-user to operate by hand or with common tools. The clamping components 410-412 may produce sufficient axial force to secure the connection links together in an immovable position that prevents unwanted movement.

Figure 4D:
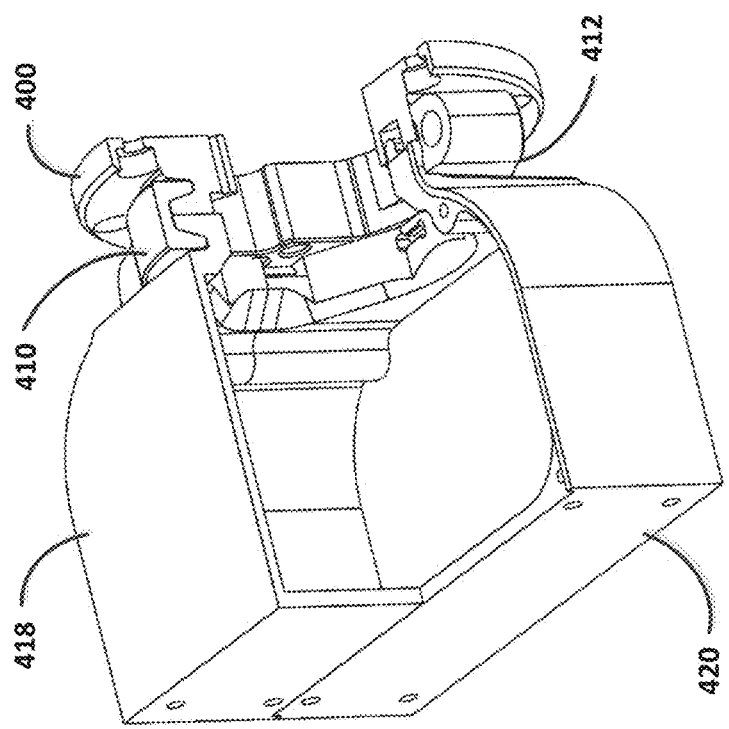
FIG. 4D illustrates an example assembly of the components shown in FIGS. 4A-4C.
Figure 4C:
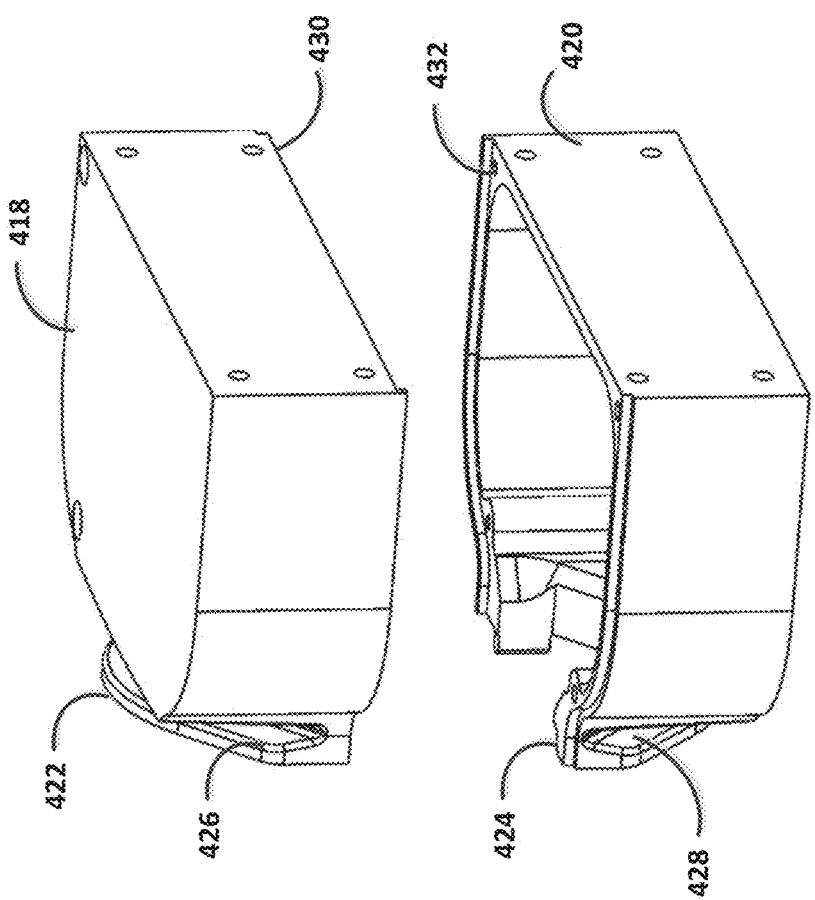
FIG. 4C illustrates another example connection link that includes multiple components assembled together.

FIG. 4C illustrates another example connection link that includes multiple components assembled together. The connection link includes components 418-420 assembled together to form the connection link. When assembled, the connection link further includes a ring structure that includes half ring structures 422-424 assembled together, which each respectively include channels 426-428 extending around the outside of the ring structure. In order to form the connection link shown in FIG. 4C, the components 418-420 may further include structural features 430-432 to secure a connection between the components 418-420. In other examples, a connection link may include additional components assembled together to form the connection link.

FIG. 4D illustrates an example assembly of the components shown in FIGS. 4A-4C. The example assembly shows the various components shown in FIGS. 4A-4C connected together in a secure mechanical configuration with portions of the components not shown for illustration purposes. The assembly configured together may enable the robotic components to operate under a load. As such, the interlocking connection between the various components within the assembly illustrates the durability and precise connection enabled by the configuration of the various components.

Figure 5:
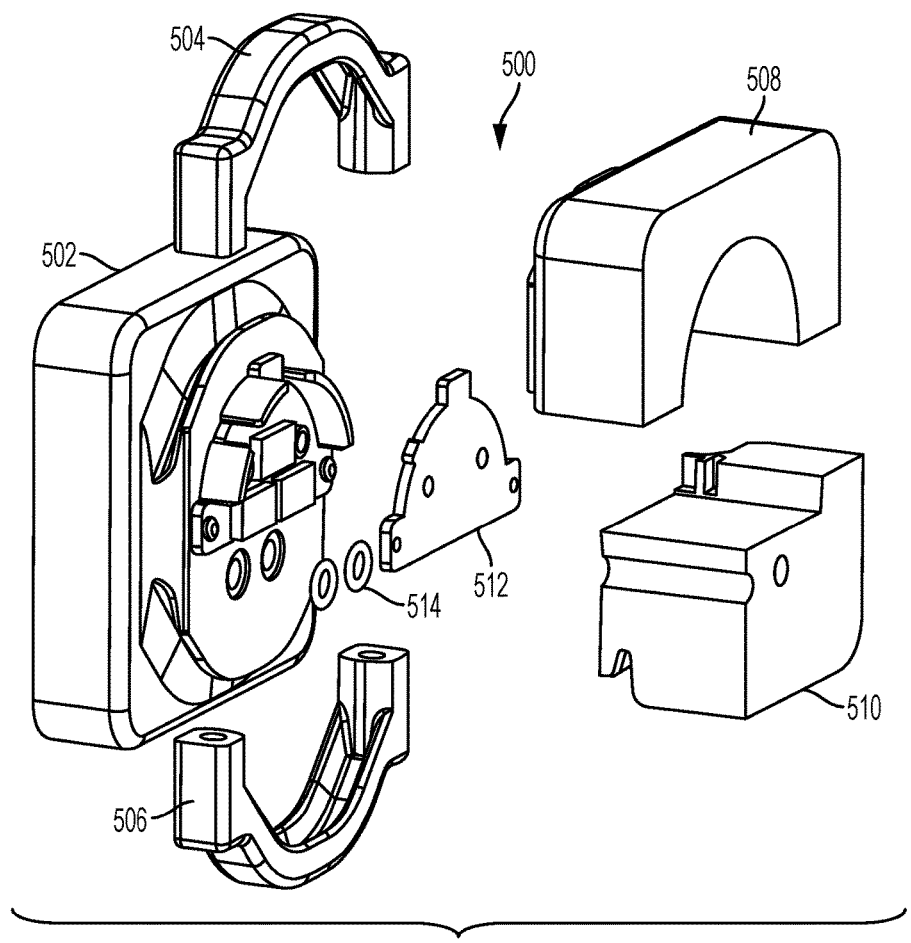
FIG. 5 illustrates another exploded view showing components of an example assembly for linking robotic components.

FIG. 5 illustrates another exploded view showing components of an example assembly for linking robotic components. The components within the example assembly 500 include a connection link 502, clamping components 504-506, a structured connection link made up of connection link components 508-510, an intermediate component 512, and rings 514. The components shown within the example assembly 500 may vary within other examples, including have different sizes, positions, structures, and the example assembly 500 may also include more or less components in other implementations.

The connection link 502 may be configured to connect to other connection links enabling the connection link 502 to precisely link robotic components within a robotic device. In some implementations, the connection link 502 may have a similar structure with more or less features. For example, the connection link 502 may include slots for electrical connections and/or fluid connections. Likewise, similar to the connection links previously described herein, the connection link 502 may attach to components of a robotic device and serve as a connection point with another connection link, for example. The connection link 502 may include various structural components that enable the connection link to connect with another connection link. The structural components may hold the connection link 502 in alignment and position with another connection link. Further, the structural components may assist with preventing unwanted movement and establishing connections between robotic components.

The clamping components 504-506 shown in FIG. 5 may function similarly to the other clamping components described herein. The clamping components may hold the connection links and/or other component in the example assembly together in a precise configuration. The precise configuration may reduce and possibly eliminate unwanted movement between robotic components that are linked via the assembly. As shown in FIG. 5, the clamping components 504-506 may lock together around and/or into particular channels of the connection links to precisely link the connection links together in a way the prevents unwanted movement between the connection links. Further, the clamping components 504-506 may prevent movement within the assembly by coupling to straight surfaces. The clamping components may connect together via various fastening means, such as screws and bolts, for example. Other examples of clamping components may exist within other example embodiments.

To enable a link between robotic components within a robotic device, the assembly 500 also includes another connection link that is made up by coupling connection link components 508-510 together. When connected together, the components 508-510 form a connection link that may precisely lock with connection link 502 with pressure applied by the clamping components 504-506. The components 508-510 form a connection link that includes a slot for placing electrical and/or fluid connections through. Furthermore, although FIG. 5 illustrates the connection link having components 508-510, a connection link may include more or less components having various structures within other example embodiments.

As illustrated, the component 510 is shown partially missing a portion to show the channel built into the connection link component 510 that enables the transfer of fluids and/or other materials (e.g., electrical wiring). As such, other components within the assembly may include similar channels or other structural features that enable robotic components to transfer fluids or establish forms of connection.

The intermediate component 512 may assist with aligning the connection link 502 and connection link components 508-510. The intermediate component 512 may align features of the components within the assembly 500. As shown, the intermediate component 512 may include slots or pins for connecting to one or both of the connection links. In some examples, an assembly may include multiple intermediate components that assist in aligning or precisely positioning the connection links within the assembly. Further, the intermediate component 512 may also be configured to connect electrical components and/or components within the assembly for transferring fluids. The intermediate component 512 may also block exposure of some components, for example. Other uses of intermediate components may exist as well.

The rings 514 (also known as "o-rings") may assist in connecting and aligning features within the precision assembly 500. The rings 514 may be made of various materials, such as rubbers, synthetic rubbers, and/or other types of materials. Further the rings 514 may range in size, thickness and/or other parameters within examples. The rings 514 may serve as a seal to prevent loss of fluids between materials or to assist in preventing movement between components within the assembly. In other examples, other types of seals may assist in enabling robotic components to transfer fluids and/or other materials between assemblies and throughout the robotic device.

Further, the assembly 500 may include other fluid handling components, such as check valves, filters, or traps, which may be positioned on the opposite ends of the connection links interface to aid in removal and assembly maintenance. The assembly 500 may include other components that block electrical connections during assembly and disassembly of the connection links or during maintenance of the robotic connections. The assembly 500 may include latches, pins, or other structural features that may block fluids or lock together components in a precise manner.

Figure 6:
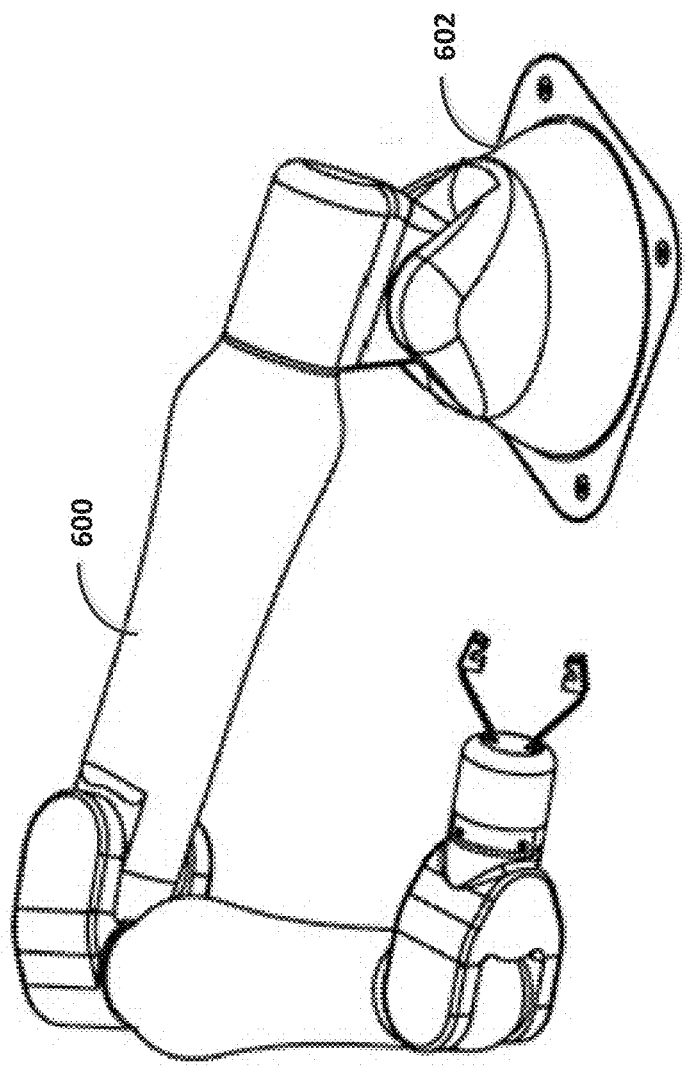
FIG. 6 illustrates an example robotic manipulator including robotic components assembled together by respective sets of connection links.

FIG. 6 illustrates an example robotic manipulator including robotic components assembled together by respective sets of connection links. The robotic manipulator 600 includes multiple components arranged and connected to enable the robotic manipulator to perform various tasks and operations. Different components of the robotic manipulator 600 may be connected via respective sets of connection links, such as connection 602 shown in FIG. 6. As such, the different connect points between robotic parts may include connection links configured to enable the assembly and disassembly of the robotic manipulator 600 by a user.

Within different example configurations, the robotic manipulator 600 may include various types of connection links that may vary depending on the particular operations and/or functions of the robotic manipulator 600. Different robotic manipulators may require diverse sets of connections link, which may vary based on the components making up the particular robotic manipulator. For example, the robotic manipulator may include components connected at different points by various sets of connection links described herein. In some instances, other types of connection links based on the ones described herein may be used as well within the robotic manipulator.

Further, the size and/or position of robotic parts that need to be connected may cause different assemblies to be used to provide precise alignment and mechanical connection between the parts. By providing precise and secure connections between components of the robotic manipulator 600, the robotic manipulator 600 may be configured to manipulate materials, including moving or operating various materials. The connection links within the robotic manipulator 600 may secure the components of the robotic manipulator together. Many other example different configurations of connection links may also be provided using any of the components described herein in any combination.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An assembly comprising:
   a first link having a circular planar surface comprising:
      a ring structure extending from the circular planar surface for inserting into a given pocket structure of a corresponding link, wherein an outer surface of the ring structure includes one or more planar regions for coupling to respective planar regions on an inner surface of the given pocket structure of the corresponding link to secure the first link and the corresponding link in a fixed geometric configuration;
      a first plurality of structural features positioned incrementally at respective positions proximal to an outer edge of the circular planar surface for coupling the first link with the corresponding link in the fixed geometric configuration; and
      a first plurality of electrical components positioned proximal to a center of the circular planar surface for enabling one or more electrical connections with the corresponding link;
   a second link having a circular planar surface comprising:
      a pocket structure extending into the circular planar surface of the second link for coupling around the ring structure of the first link when the second link is coupled to the first link in the fixed geometric configuration, wherein an inner surface of the pocket structure includes one or more corresponding planar regions for coupling around the ring structure extending from the circular planar surface of the first link;
      a second plurality of structural features positioned incrementally at respective positions proximal to an outer edge of the circular planar surface for coupling to the first plurality of structural features to couple the second link with the first link in the fixed geometric configuration such that an orientation of the second link relative to the first link is uniquely defined in an immovable position; and a second plurality of electrical components for coupling with the first plurality of electrical components of the first link defining one or more electrical connections between the first link and the second link when the first link and the second link are coupled in the fixed geometric configuration; and a clamping component comprising:

respective channels for coupling around a radially extending flange formed along respective outer surfaces of the first link and the second link when the first link and second link are coupled in the fixed geometric configuration in a manner such that the clamping component secures the orientation of the second link relative to the first link in the immovable position.

2. The assembly of claim 1, wherein the respective circular planar surfaces of the first link and the second link are approximately the same size.

3. The assembly of claim 1,
wherein the ring structure extending from the circular planar surface of the first link encircles an area of the circular planar surface of the first link comprising the first plurality of electrical components.

4. The assembly of claim 1, wherein the first plurality of electrical components includes one or more pogo pins for coupling with respective electrical connections of the second plurality of electrical components defining one or more electrical connections between the first link and the second link.

5. The assembly of claim 1, wherein respective electrical connections of the one or more electrical connections between the first link and the second link are configured to enable transmission of power and control signals between the first link and the second link.

6. The assembly of claim 1, wherein the second plurality of electrical components includes a printed circuit board coupled to the circular planar surface of the second link, wherein the printed circuit board comprises one or more respective electrical components for coupling with respective electrical components of the first plurality of electrical components of the first link defining one or more electrical connections between the first link and the second link.

7. The assembly of claim 1, wherein the second plurality of electrical components includes one or more foil pads configured to couple to respective pogo pins of the first plurality of electrical components.

8. The assembly of claim 1, further comprising one or more components that enable a transfer of fluids between the first link and the second link, wherein the one or more components includes one or more of a check valve, a filter, and a trap.

9. The assembly of claim 1, wherein the first plurality of structural features and the second plurality of structural features comprise one or more threaded holes for coupling the second link with the first link in the fixed geometric configuration.

10. An assembly comprising:
a first link having a circular planar surface comprising:
a ring structure extending from the circular planar surface for coupling to an inner surface of a through hole of a corresponding link, wherein an outer surface of the ring structure includes one or more planar regions for coupling to respective planar regions on the inner surface of the through hole of the corresponding link to secure the first link and the corresponding link in a fixed geometric configuration; and a first plurality of structural features including one or more pins and one or more slots positioned incrementally at respective positions proximal to an outer edge of the circular planar surface for coupling with the corresponding link in the fixed geometric configuration;

a second link having a circular planar surface comprising:
a plurality of corresponding structural features having respective slots for coupling with the one or more pins and respective pins for coupling with the one or more slots of the first link to couple the second link with the first link in the fixed geometric configuration such that an orientation of the second link relative to the first link is uniquely defined in an immovable position; and a through hole having an inner surface with one or more corresponding planar regions for coupling around the ring structure extending from the circular planar surface of the first link when the first link and the second link are coupled in the fixed geometric configuration a clamping component comprising:
respective channels for coupling around a radially extending flange formed along respective outer surfaces of the first link and the second link when the first link and second link are coupled in the fixed geometric configuration in a manner such that the clamping component secures the orientation of the second link relative to the first link in the immovable position.

11. The assembly of claim 10, wherein the ring structure includes one or more planar regions for coupling with respective planar regions of the through hole of the second link to secure the second link and first link when coupled in the fixed geometric configuration such that the orientation of the second link relative to the first link is uniquely defined in the immovable position.

12. The assembly of claim 10, further comprising a component having respective extensions for coupling around respective outer surfaces of the first link and second link when the first link and second link are coupled in the fixed geometric configuration to secure the first link and the second link coupled in the fixed geometric configuration such that the orientation of the second link relative to the first link is uniquely defined in the immovable position.

\* \* \* \* \*